(12) United States Patent
Racicot et al.

(10) Patent No.: US 7,862,127 B2
(45) Date of Patent: Jan. 4, 2011

(54) CHROME-PLATED HUBCAP AND A WHEEL ASSEMBLY FOR A VEHICLE

(75) Inventors: Michael H. Racicot, Rochester Hills, MI (US); Patricia A. Jones, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 63 days.

(21) Appl. No.: 12/324,167

(22) Filed: Nov. 26, 2008
(Under 37 CFR 1.47)

(65) Prior Publication Data
US 2010/0127559 A1   May 27, 2010

(51) Int. Cl.
*B60B 7/14* (2006.01)
*B60B 27/00* (2006.01)
(52) U.S. Cl. .................. 301/37.372; 301/108.3
(58) Field of Classification Search ............ 301/37.101, 301/37.372, 37.102, 37.371, 37.106, 37.107, 301/37.374, 37.375, 108.1, 108, 3, 108.4
See application file for complete search history.

(56) References Cited

U.S. PATENT DOCUMENTS

| | | | | |
|---|---|---|---|---|
| 3,554,536 A | * | 1/1971 | Richter | 301/108.4 |
| 4,457,560 A | * | 7/1984 | Rowe et al. | 301/37.42 |
| 4,606,582 A | * | 8/1986 | Warren | 301/37.372 |
| 4,998,780 A | | 3/1991 | Eshler et al. | |
| 6,070,947 A | * | 6/2000 | Hoyle, Jr. | 301/37.375 |
| 6,419,327 B1 | * | 7/2002 | Renshaw | 301/37.376 |
| 6,913,322 B1 | * | 7/2005 | Allen | 301/37.371 |

FOREIGN PATENT DOCUMENTS

| | | |
|---|---|---|
| WO | 2006101788 A1 | 9/2006 |
| WO | 2007120367 A1 | 10/2007 |

* cited by examiner

*Primary Examiner*—Jason R Bellinger
(74) *Attorney, Agent, or Firm*—Quinn Law Group, PLLC

(57) ABSTRACT

A hubcap configured for attachment to a wheel of a vehicle via a plurality of nutcaps that are removably attachable to a plurality of lugnuts of the vehicle includes a chrome-plated body and a standoff. The chrome-plated body defines an inner surface having a sidewall. The standoff is configured to distribute a force, arising during attachment of the plurality of nutcaps to the plurality of lugnuts, through the hubcap to the wheel of the vehicle. The standoff includes a proximal portion spaced apart from the sidewall and a distal portion including a hollow tubular member defining a bore. A wheel assembly configured for attachment to an axle of the vehicle includes the plurality of nutcaps, the wheel, the hubcap, and an insulator configured to protect the hubcap from heat and disposed within the hollow tubular member of the standoff.

20 Claims, 3 Drawing Sheets

CHROME-PLATED HUBCAP AND A WHEEL ASSEMBLY FOR A VEHICLE

TECHNICAL FIELD

The present invention generally relates to wheels for vehicles, and more specifically, to a chrome-plated hubcap and a wheel assembly for a vehicle.

BACKGROUND OF THE INVENTION

Wheeled vehicles, such as automobiles, customarily include hubcaps that typically cover a central portion of the wheels of the vehicle both for protection, e.g., corrosion and impact resistance, and aesthetics, e.g., color and shine. One type of hubcap, a bolt-on hubcap, typically attaches to the vehicle via nutcaps threaded onto lugnuts of the vehicle.

Vehicle consumers increasingly expect aesthetically-pleasing bolt-on hubcaps, and, as such, chrome-plated bolt-on hubcaps are a popular design feature for vehicles. During forming, chrome-plated bolt-on hubcaps typically undergo an electroplating surface treatment which dips a raw, preform hubcap in a series of chemical baths, e.g., copper, nickel, and chrome, and results in a shiny, aesthetically-pleasing hubcap.

Problematically, however, the scrap rate for such hubcaps may be high. For example, existing chrome-plated bolt-on hubcaps include design features, such as standoffs, which allow chemical bath pooling in the hubcap during electroplating surface treatment. Chemical bath pooling contributes to bath tank contamination as the hubcap is dipped in subsequent bath tanks, and may result in substantial processing time delay and added processing costs while the chemical baths are decontaminated. Additionally, chemical bath pooling may decrease the effectiveness of the electroplating surface treatment and may produce an imperfect chrome-plating, i.e., a non-shiny, non-aesthetically-pleasing hubcap that is unacceptable to vehicle manufacturers and consumers. Such unacceptable hubcaps are scrapped and must be reprocessed, thereby further contributing to processing time delay and added processing costs.

Further, existing chrome-plated bolt-on hubcaps may also suffer from chrome-cracking, i.e., cracking of the chrome-plating, during attachment to the vehicle. In particular, as the nutcaps are threaded onto and tighten against the lugnuts of the vehicle, substantial force is applied to the hubcap, which may result in chrome-cracking. Chrome-cracking contributes both to decreased customer satisfaction and increased warranty costs for vehicle manufacturers.

Existing chrome-plated bolt-on hubcaps often include at least one standoff per lug of the vehicle in an attempt to reduce the force applied to the hubcap during nutcap tightening, and thereby reduce the incidence of chrome-cracking. However, an increased number of standoffs provides an increased opportunity for chemical bath pooling and the associated disadvantages thereof, and also contributes to increased hubcap weight and processing costs.

SUMMARY OF THE INVENTION

A hubcap configured for attachment to a wheel of a vehicle via a plurality of nutcaps that are removably attachable to a plurality of lugnuts of the vehicle includes a body having chrome-plating and configured to cover at least a portion of the wheel. The body defines an outer surface and an inner surface. The inner surface has a sidewall, a first protrusion having a first surface, and a second protrusion having a second surface. The body also defines a first chamber configured to receive a lug of the vehicle and extending through the first protrusion and the outer surface, and a second chamber configured to receive a lug of the vehicle and extending through the second protrusion and the outer surface. The hubcap also includes a standoff configured to distribute a force through the hubcap to the wheel of the vehicle, wherein the force arises during attachment of the plurality of nutcaps to the plurality of lugnuts. The standoff includes a proximal portion spaced apart from the sidewall and disposed adjacent the first surface and the second surface, and a distal portion including a hollow tubular member defining a bore therethrough.

A wheel assembly configured for attachment to an axle of a vehicle via a plurality of lugnuts of the vehicle includes a wheel and a plurality of nutcaps removably attached to the plurality of lugnuts. The wheel defines a plurality of holes therethrough configured for receiving the plurality of lugnuts. The wheel is removably disposed adjacent a hub of the axle via the plurality of lugnuts extending through the plurality of holes. The wheel assembly also includes the hubcap and an insulator. The insulator is configured to protect the hubcap from heat and is disposed within the hollow tubular member of the standoff.

The hubcap and wheel assembly minimize scrap rates for hubcaps having chrome-plating. In particular, the standoff of the hubcap minimizes opportunity for chemical bath pooling during electroplating surface treatment, and thereby minimizes bath tank contamination, processing time delay, and processing costs. Further, as compared to existing hubcaps and wheel assemblies, the hubcap and wheel assembly of the present invention minimize chrome-cracking during attachment of the hubcap to the vehicle and therefore enhance customer satisfaction and minimize warranty costs for vehicle manufacturers. Moreover, the hubcap and wheel assembly include fewer standoffs than existing hubcaps and wheel assemblies without inducing a corresponding increase in chrome-cracking. Fewer standoffs also result in decreased hubcap weight, reduced opportunity for chemical bath contamination during electroplating surface treatment, and decreased processing costs.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
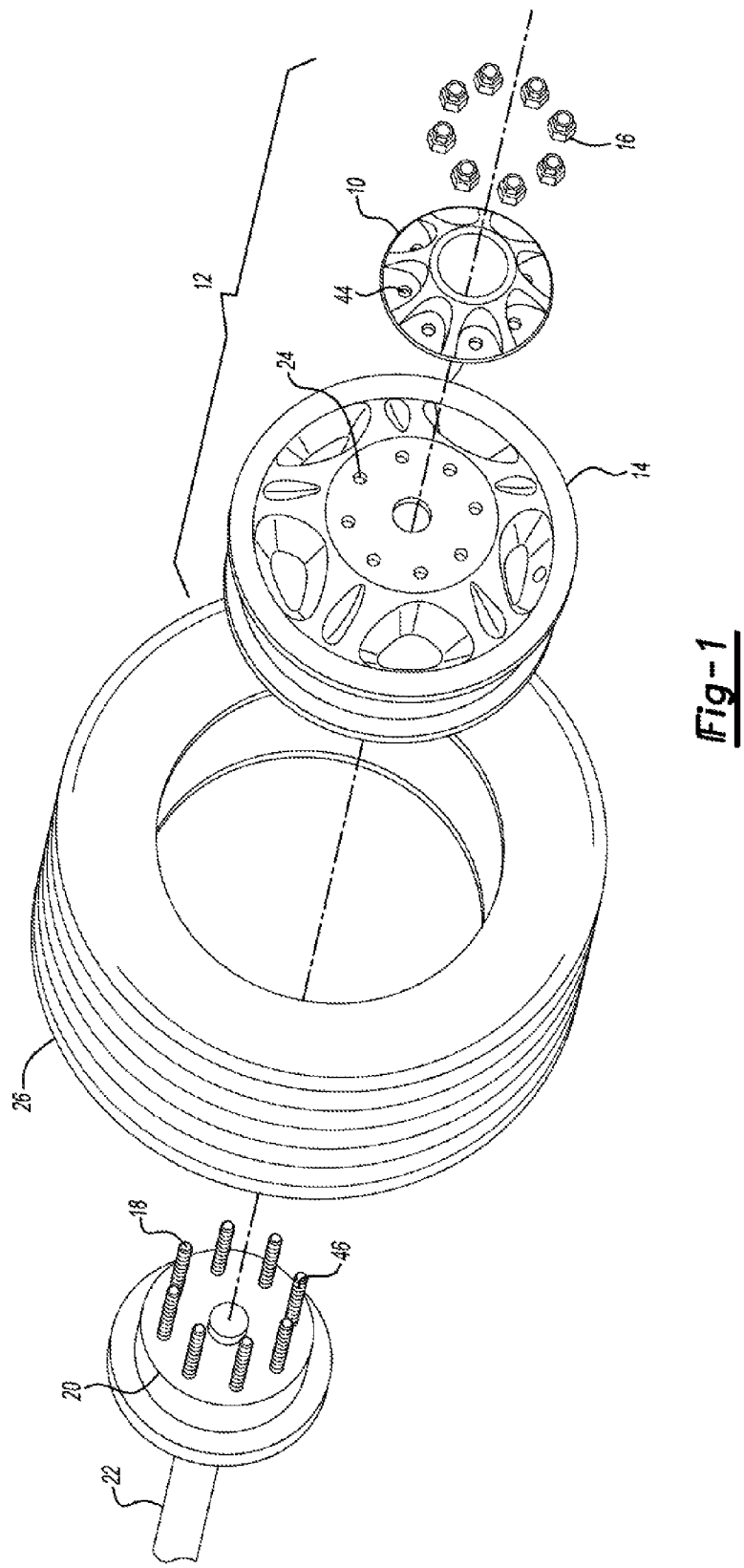
FIG. 1 is an exploded view of an illustration of an exemplary hubcap and wheel assembly for a vehicle.

Referring to the drawings, wherein like reference numerals refer to like components, a hubcap configured for attachment to a wheel of a vehicle is shown generally at 10 in FIG. 1. The hubcap 10 of the present invention is typically useful for automotive applications, such as a dual-axle pick-up truck. However, it is to be appreciated that the hubcap 10 of the present invention may also be useful for non-automotive applications, such as, but not limited to, aviation, rail, and recreational vehicle applications.

Referring to FIG. 1, the hubcap 10 is typically installed on the vehicle (not shown) as part of a wheel assembly. The wheel assembly is shown generally at 12 in FIGS. 1 and 2 and is set forth in more detail below. In general, the hubcap 10 typically attaches to a wheel 14 of the vehicle. More specifically, the hubcap 10 is configured for attachment to the wheel 14 of the vehicle via a plurality of nutcaps 16 that are removably attachable to a plurality of lugnuts 18 of the vehicle, as set forth in more detail below. Moreover, the wheel 14 typically attaches to a hub 20 of an axle 22 of the vehicle. In use, the hub 20 typically defines holes therein (not shown) and is configured for threaded placement of the plurality of lugnuts 18. A corresponding plurality of holes 24 defined by the wheel 14 allow placement of the plurality of lugnuts 18 through the aligned plurality of holes 24, and the plurality of nutcaps 16 secure the wheel 14 to the hub 20. Further, the wheel 14 typically supports a tire 26 and provides a rolling surface for the vehicle.

Figure 2:
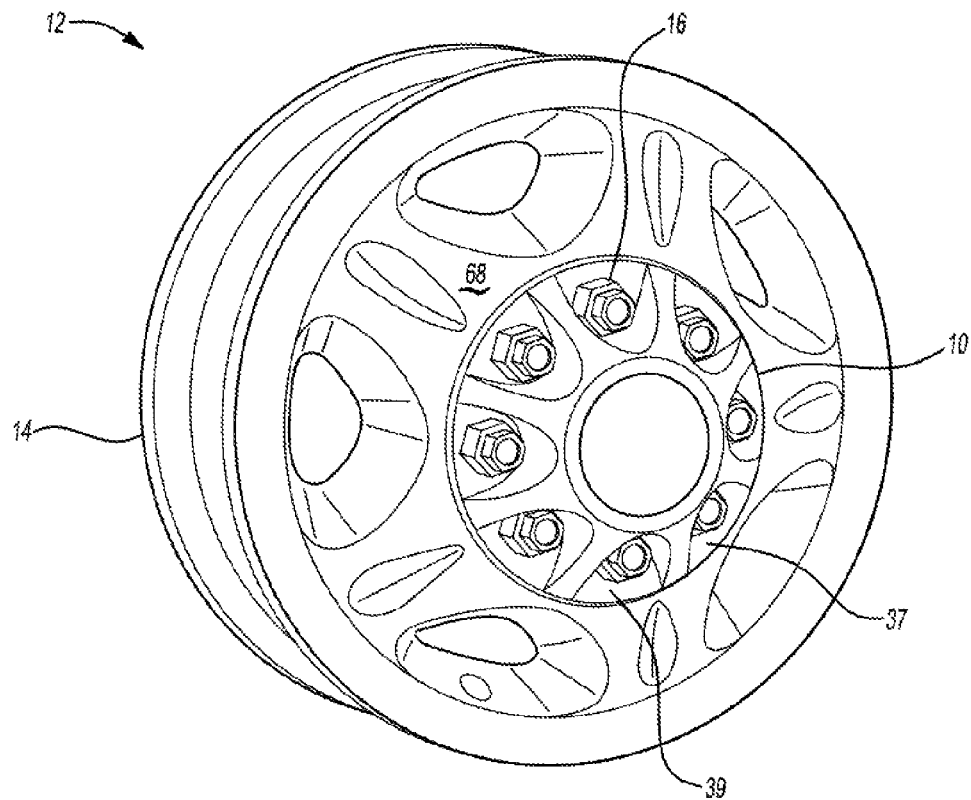
FIG. 2 is a perspective view of an illustration of the hubcap and wheel assembly of FIG. 1.
Figure 3:
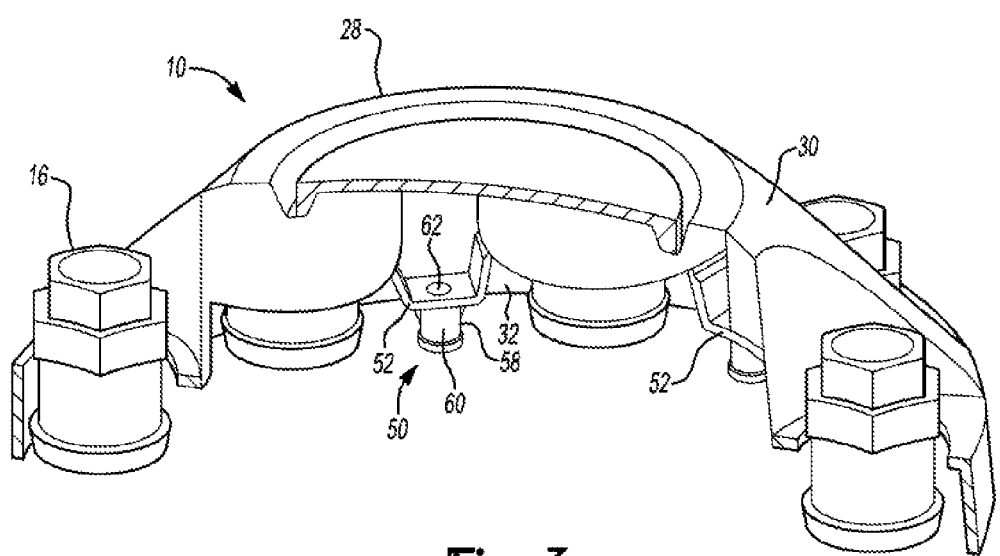
FIG. 3 is a cut-away perspective view of an illustration of the hubcap of FIGS. 1 and 2 and includes a standoff.

Referring to FIG. 3, the hubcap 10 includes a body 28 having chrome-plating and is configured to cover at least a portion of the wheel 14. As used herein, the terminology "chrome-plating" signifies that the hubcap 10 has a chrome surface finish, e.g., that the hubcap 10 has undergone an electroplating surface treatment during forming which dips a raw, preform hubcap in a series of chemical baths, e.g., copper, nickel, and chrome, and results in a shiny, chrome-plated or chrome-related-plated hubcap 10. In one embodiment, the hubcap 10 covers a central portion of the wheel 14, as shown in FIG. 2. However, it is to be appreciated that the hubcap 10 may cover a smaller or larger portion of the wheel 14 and remain within the scope of the present invention.

Figure 4:
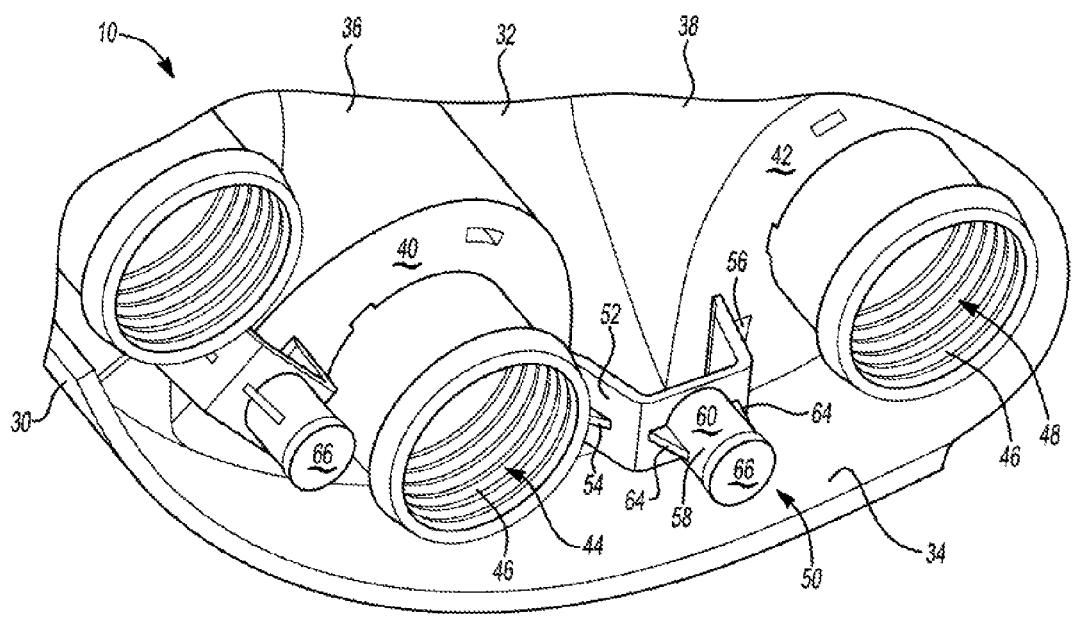
FIG. 4 is a second cut-away perspective view of an illustration of the hubcap of FIGS. 1 and 2 that illustrates the standoff of FIG. 3 spaced apart from a sidewall of the hubcap.

Referring to FIGS. 3 and 4, the body 28 defines an outer surface 30 and an inner surface 32. As used herein, the outer surface 30 of the body 28 is visible to an observer when the wheel 14 is attached to the vehicle and is covered by the hubcap 10. Therefore, the outer surface 30 of the body 28 is configured to provide an aesthetic and protective cover for at least a portion of the wheel 14. Conversely, the inner surface 32 faces and abuts the wheel 14 and is not typically visible to an observer when the wheel 14 is attached to the vehicle. In one embodiment, both the inner surface 32 and the outer surface 30 have the chrome-plating.

Referring to FIG. 4, the inner surface 32 of the hubcap 10 has a sidewall 34, a first protrusion 36, and a second protrusion 38. The first protrusion 36 and the second protrusion 38 are typically configured to provide one or more design elements of the hubcap 10. For example, as shown in FIG. 2, the first protrusion 36 and the second protrusion 38 of the inner surface 32 may result in corresponding aesthetic indentations 37, 39, in the outer surface 30, as shown in FIG. 2. The first protrusion 36 has a first surface 40 and the second protrusion 38 has a second surface 42. In one embodiment, the first surface 40 and the second surface 42 are each substantially perpendicularly disposed to the sidewall 34. As used herein, the terminology "substantially" is used to represent the inherent degree of uncertainty that may be attributed to any quantitative comparison, value, measurement, or other representation. As such, it refers to an arrangement of elements or features that, while in theory would be expected to exhibit exact correspondence or behavior, may in practice embody something slightly less than exact. The term also represents the degree by which a quantitative representation may vary from a stated reference without resulting in a change in the basic function of the subject matter at issue. Therefore, it is contemplated that the first surface 40 and the second surface 42 may be slightly less than or more than perpendicularly disposed to the sidewall 34.

The hubcap 10 also includes a first chamber 44 configured to receive a lug 18 of the vehicle and extending through the first protrusion 36 and the outer surface 30. With reference to FIG. 4, the first chamber 44 typically includes threads 46 for receiving the lug 18 of the vehicle and extends through the body 28 of the hubcap 10 entirely. Stated differently, in operation, when the hub 20 is attached to the wheel 14, the lug 18 of the vehicle typically protrudes from the first chamber 44 of the body 28 of the hubcap 10 to allow clearance for the nutcap 16 to be tightened onto the lug 18 adjacent the outer surface 30 of the hubcap 10.

Similarly, the hubcap 10 also includes a second chamber 48 configured to receive a lug 18 of the vehicle and extending through the second protrusion 38 and the outer surface 30. Also with reference to FIG. 4, the second chamber 48 typically includes threads 46 for receiving the lug 18 of the vehicle and extends through the body 28 of the hubcap 10 entirely. Stated differently, in operation, when the hub 20 is attached to the wheel 14, the lug 18 of the vehicle typically protrudes from the second chamber 48 of the body 28 of the hubcap 10 to allow clearance for the nutcap 16 to be tightened onto the lug 18 adjacent the outer surface 30 of the hubcap 10.

The body 28 also includes a standoff 50. The standoff 50 is configured to distribute a force through the hubcap 10 to the wheel 14 of the vehicle. The force typically arises during attachment of the plurality of nutcaps 16 to the plurality of lugnuts 18 of the vehicle. That is, when a nutcap 16 is tightened against the lug 18, the force generated by the tightening is distributed through the hubcap 10 to the wheel 14 by the standoff 50.

Referring to FIG. 4, the standoff 50 includes a proximal portion 52 spaced apart from the sidewall 34 and disposed adjacent the first surface 40 and the second surface 42. That is, the proximal portion 52 forms a bridge between the first protrusion 36 and the second protrusion 38. More specifically, the proximal portion 52 forms a bridge between the first surface 40 of the first protrusion 36 and the second surface 42 of the second protrusion 38. Notably, the proximal portion 52 of the standoff 50 is spaced apart from the sidewall 34 so as to minimize an opportunity for chemical bath pooling during electroplating surface treatment between the proximal portion 52 and the sidewall 34.

In another embodiment, the proximal portion 52 further includes a first gusset 54 and a second gusset 56 each spaced apart from the sidewall 34 and adjacent the first surface 40 and the second surface 42, respectively. The first gusset 54 and the second gusset 56 are typically configured to provide support to the proximal portion 52, e.g., to brace the proximal portion 52.

Referring to FIGS. 3 and 4, the standoff 50 also includes a distal portion 58 including a hollow tubular member 60 defining a bore 62 therethrough. The distal portion 58 extends away from the proximal portion 52 of the standoff 50 towards the wheel 14 and hub 20 of the vehicle, i.e., away from the inner surface 32 of the body 28 of the hubcap 10. The bore 62 of the hollow tubular member 60 is configured to allow fluid of the chemical baths to drain from, rather than accumulate within, the hollow tubular member 60 during electroplating surface treatment. Thus, the hollow tubular member 60 of the distal portion 58 of the standoff 50 also minimizes the opportunity for chemical bath pooling during electroplating surface treatment.

Further, the distal portion 58 of the standoff 50, including the hollow tubular member 60, is spaced apart from the sidewall 34 and is therefore also configured to minimize an opportunity for chemical bath pooling between the distal portion 58 and the sidewall 34. Therefore, the standoff 50 is configured to distribute the force through the hubcap 10 to the wheel 14 while minimizing an opportunity for chemical bath pooling during electroplating surface treatment. Thus, the standoff 50 minimizes bath tank contamination, processing time delay, and processing costs of the hubcap 10.

In another embodiment, the distal portion 58 further includes a plurality of gussets 64 extending from the hollow tubular member 60 and disposed adjacent the proximal portion 52 of the standoff 50. For example, the distal portion 58 may include two gussets. The plurality of gussets 64 are typically configured to provide support to the tubular hollow member 60 of the distal portion 58, e.g., to brace the tubular hollow member 60.

The hubcap 10 may include a plurality of the standoffs 50. It is to be appreciated that in an embodiment including the plurality of the standoffs 50, the inner surface 32 of the body 28 of the hubcap 10 typically includes more than two protrusions. For example, the inner surface 32 typically includes two protrusions per each standoff 50, since, as set forth above, each proximal portion 52 of each standoff 50 typically forms a bridge between two protrusions. Likewise, each protrusion typically defines a chamber configured to receive a lug 18 of the vehicle.

In one embodiment, the hubcap 10 includes four of the standoffs 50. In this embodiment, although the inner surface 32 of the hubcap 10 may include merely the first protrusion 36 and the second protrusion 38, it is to be appreciated that the hubcap 10 typically includes a plurality of protrusions. For example, to enhance aesthetics, the inner surface 32 of the body 28 of the hubcap 10 typically includes a number of protrusions equal to a number of lugnuts 18 of the vehicle. However, the inner surface 32 of the body 28 of the hubcap 10 may alternatively include more or less protrusions than the number of lugnuts 18 of the vehicle.

In the embodiment including four of the standoffs 50, the vehicle typically includes eight lugnuts 18. Nonetheless, the chrome-plating of the body 28 of the hubcap 10 is substantially free from chrome-cracking caused by the force arising during attachment of the plurality of nutcaps 16 to the plurality of lugnuts 18. That is, the four of the standoffs 50 typically adequately distribute the force through the hubcap 10 to the wheel 14 to minimize chrome-cracking and simultaneously minimize an opportunity for chemical bath pooling during electroplating surface treatment as compared to hubcaps including eight of the standoffs 50. Thus, in this embodiment, the hubcap 10 also provides a weight reduction and a cost savings as compared to existing hubcaps.

In another embodiment, the hubcap 10 includes eight of the standoffs 50. Similarly, in this embodiment, although the inner surface 32 of the hubcap 10 may include merely the first protrusion 36 and the second protrusion 38, it is to be appreciated that the hubcap 10 typically includes a plurality of protrusions. For example, to enhance aesthetics, the inner surface 32 of the body 28 of the hubcap 10 typically includes a number of protrusions equal to a number of lugnuts 18 of the vehicle, e.g., eight protrusions in this embodiment. The chrome-plating of the body 28 of the hubcap 10 is substantially free from chrome-cracking caused by the force arising during attachment of the plurality of nutcaps 16 to the plurality of lugnuts 18. Therefore, the standoffs 50 typically adequately distribute the force through the hubcap 10 to the wheel 14 and advantageously minimize an opportunity for chemical bath pooling during electroplating surface treatment. Thus, in this embodiment, the hubcap 10 typically minimizes scrapped hubcaps 10 during processing and thus minimizes processing costs.

The hubcap 10 is typically formed via injection molding, and is typically formed from a polymer. As known in the art, injection molding is a manufacturing technique wherein molten material, e.g., the polymer, is injected at elevated pressure into a mold defining an inverse of the shape of the hubcap 10. The polymer of the hubcap 10 is typically selected from the group of polycarbonates, acrylonitrile butadiene styrene, and combinations thereof.

Referring now to FIGS. 1 and 2, the wheel assembly 12 is configured for attachment to the axle 22 of the vehicle via the plurality of lugnuts 18 of the vehicle. The wheel assembly 12 includes the plurality of nutcaps 16 removably attached to the plurality of lugnuts 18. As used herein, the terminology "removably attached" indicates that the plurality of nutcaps 16 may be attached, removed, and reattached to the plurality of lugnuts 18 of the vehicle. For example, in operation, the plurality of nutcaps 16 is typically attached to the plurality of lugnuts 18 of the vehicle. However, during maintenance, the plurality of nutcaps 16 may be removed and spaced apart from the plurality of lugnuts 18. The plurality of nutcaps 16 typically include threads configured for communication with corresponding threads 46 of the plurality of lugnuts 18.

The wheel assembly 12 also includes the wheel 14. The wheel 14 typically defines the plurality of holes 24 therethrough configured for receiving the plurality of lugnuts 18. That is, the wheel 14 typically defines a number of holes 24 equal to the number of lugnuts 18 of the vehicle so that each lug 18 is received by a hole 24 of the wheel 14. Therefore, the wheel 14 is removably disposed adjacent the hub 20 of the axle 22 via the plurality of lugnuts 18 extending through the plurality of holes 24. For example, in use, the wheel 14 is typically disposed adjacent each lug 18 as the plurality of lugnuts 18 extend through the plurality of holes 24 of the wheel 14, and disposed adjacent the hub 20 of the axle 22. However, during maintenance, the wheel 14 may be removed from the vehicle and therefore spaced apart from the plurality of lugnuts 18 and the hub 20 of the axle 22.

The wheel 14 is typically formed of metal, e.g., steel or aluminum. The wheel 14 may include a surface finish, e.g., chrome-plating, a color, or a combination thereof, on all or some portion of the wheel 14.

The wheel assembly 12 also includes the hubcap 10 including the body 28 and the standoff 50, as set forth above. In operation, the wheel 14 is typically disposed adjacent both the hub 20 of the axle 22 and the hubcap 10, i.e., sandwiched between the hub 20 and the hubcap 10, via the plurality of lugnuts 18 extending through the plurality of holes 24 of the wheel and through at least the first chamber 44 and the second chamber 48 of the hubcap 10.

Referring to FIG. 4, the wheel assembly 12 also includes an insulator 66. The insulator 66 is configured to protect the hubcap 10 from heat and is disposed within the hollow tubular member 60 of the standoff 50. That is, during operation of the vehicle, heat from braking may be transferred through the wheel 14 to the hubcap 10. The insulator 66 insulates and protects the hubcap 10, specifically the standoff 50 of the hubcap 10, from such heat. After the electroplating surface treatment of the hubcap 10, the insulator 66 is typically placed within the hollow tubular member 60 of the distal portion 58 of the standoff 50, thus sealing off an end of the hollow tubular member 60.

The insulator 66 is typically formed from a non-metal. For example, the insulator 66 may be formed from one or more polymers. In one embodiment, the insulator 66 is formed from nylon.

In one embodiment, the wheel assembly 12 includes a plurality of the insulators 66. It is to be appreciated that in an embodiment including the plurality of the insulators 66, the hubcap 10 of the wheel assembly 12 also typically includes the plurality of the standoffs 50 so that each insulator 66 is disposed within the hollow tubular member 60 of each standoff 50.

In one embodiment, the wheel assembly 12 includes four of the insulators 66. In this embodiment, the hubcap 10 of the wheel assembly 12 typically includes four of the standoffs 50 and eight lugnuts 18. Notably, nonetheless, the chrome-plating of the body 28 of the hubcap 10 is substantially free from chrome-cracking caused by the force arising during attachment of the plurality of nutcaps 16 to the plurality of lugnuts 18. That is, the standoffs 50 typically adequately distribute the force through the hubcap 10 to the wheel 14 to minimize chrome-cracking, and simultaneously minimize an opportunity for chemical bath pooling during electroplating surface treatment as compared to existing hubcaps including eight existing standoffs. Thus, in this embodiment, the wheel assembly 12 also provides a weight reduction and a cost savings as compared to existing wheel assemblies.

In another embodiment, the wheel assembly 12 includes eight of the insulators 66. In this embodiment, the vehicle typically includes eight of the standoffs 50 so that each insulator 66 is disposed within each hollow tubular member 60 of each standoff 50.

Referring to FIG. 2, the wheel assembly 12 may further include a decorative wheel cover 68. The decorative wheel cover 68 is typically configured to cover at least a portion of the wheel 14 and is typically disposed adjacent the wheel 14 and the hubcap 10. That is, the decorative wheel cover 68 is typically sandwiched between the wheel 14 and the hubcap 10. The decorative wheel cover 68 is typically present to provide a colored, faux chrome-plating, or protective surface finish for the wheel 14 and is often a less expensive alternative to the wheel 14 having chrome-plating.

The hubcap 10 and wheel assembly 12 of the present invention minimize scrap rates for hubcaps having chrome-plating. In particular, since the standoff 50 is spaced apart from the sidewall 34, the standoff 50 of the hubcap 10 minimizes opportunity for chemical bath pooling during electroplating surface treatment, and thereby minimizes bath tank contamination, processing time delay, and processing costs. Additionally, the hubcap 10 and wheel assembly 12 minimize chrome-cracking during attachment of the hubcap 10 to the vehicle and therefore enhance customer satisfaction and minimize warranty costs for vehicle manufacturers as compared to existing hubcaps and wheel assemblies. Moreover, the hubcap 10 and wheel assembly 12 include fewer standoffs 50 than existing hubcaps and wheel assemblies without inducing a corresponding increase in chrome-cracking. Fewer standoffs 50 also result in decreased hubcap weight, reduced opportunity for chemical bath contamination during electroplating surface treatment, and decreased processing costs.

While the best modes for carrying out the invention have been described in detail, those familiar with the art to which this invention relates will recognize various alternative designs and embodiments for practicing the invention within the scope of the appended claims.

The invention claimed is:

1. A hubcap configured for attachment to a wheel of a vehicle by a plurality of nutcaps that are removably attachable to a plurality of lugnuts of the vehicle, said hubcap comprising:
    a body having chrome-plating and configured to cover at least a portion of the wheel, said body defining;
        an outer surface;
        an inner surface having;
            a sidewall;
            a first protrusion having a first surface, and;
            a second protrusion having a second surface;
        a first chamber configured to receive a lug of the vehicle, wherein said first chamber extends through said first protrusion and said outer surface; and
        a second chamber configured to receive a lug of the vehicle, wherein said second chamber extends through said second protrusion and said outer surface; and
    a standoff configured to distribute a force through said hubcap to the wheel of the vehicle, wherein the force arises during attachment of the plurality of nutcaps to the plurality of lugnuts, said standoff including;
        a proximal portion spaced radially apart from said sidewall, wherein said proximal portion is disposed adjacent said first surface and said second surface and is configured to bridge said first surface and said second surface; and
        a distal portion including a hollow tubular member defining a bore therethrough.

2. The hubcap of claim 1, comprising a plurality of said standoffs.

3. The hubcap of claim 2, comprising four of said standoffs.

4. The hubcap of claim 2, comprising eight of said standoffs.

5. The hubcap of claim 1, wherein said chrome-plating is substantially free from chrome-cracking caused by the force.

6. The hubcap of claim 3, wherein said chrome-plating is substantially free from chrome-cracking caused by the force.

7. The hubcap of claim 1, wherein the hubcap is formed from a polymer.

8. The hubcap of claim 7, wherein the hubcap is an injection moldable polymer.

9. The hubcap of claim 7, wherein said polymer is selected from the group of polycarbonates, acrylonitrile butadiene styrene, combinations thereof.

10. The hubcap of claim 1, wherein said first surface and said second surface are each substantially perpendicularly disposed to said sidewall.

11. The hubcap of claim 1, wherein said proximal portion further includes a first gusset and a second gusset each spaced radially apart from said sidewall and adjacent said first surface and said second surface, respectively.

12. The hubcap of claim 1, wherein said distal portion further includes a plurality of gussets extending from said hollow tubular member and disposed adjacent said proximal portion of said standoff.

13. A wheel assembly configured for attachment to an axle of a vehicle by a plurality of lugnuts of the vehicle, said wheel assembly comprising:
    a plurality of nutcaps removably attached to the plurality of lugnuts;
    a wheel defining a plurality of holes therethrough configured for receiving the plurality of lugnuts, wherein said wheel is removably disposed adjacent a hub of the axle by the plurality of lugnuts extending through the plurality of holes;
    a hubcap disposed adjacent said wheel and said plurality of nutcaps, wherein said hubcap is removably attached to said wheel by threaded cooperation between said plurality of nutcaps and the plurality of lugnuts, said hubcap including:
        a body having chrome-plating and defining;
            an outer surface;
            an inner surface having;
                a sidewall;
                a first protrusion having a first surface, and;
                a second protrusion having a second surface;

a first chamber configured to receive a lug of the vehicle, wherein said first chamber extends through said first protrusion and said outer surface; and a second chamber configured to receive a lug of the vehicle, wherein said second chamber extends through said second protrusion and said outer surface; and a standoff configured to distribute a force through said hubcap to said wheel, wherein the force arises during attachment of said plurality of nutcaps to the plurality of lugnuts, said standoff including;

a proximal portion spaced radially apart from said sidewall, wherein said proximal portion is disposed adjacent said first surface and said second surface and is configured to bridge said first surface and said second surface; and a distal portion including a hollow tubular member defining a bore therethrough; and an insulator configured to protect said hubcap from heat and disposed within said hollow tubular member of said standoff.

14. The wheel assembly of claim 13, wherein said insulator is formed from a non-metal.

15. The wheel assembly of claim 14, wherein said insulator is formed from nylon.

16. The wheel assembly of claim 13, comprising a plurality of said standoffs.

17. The wheel assembly of claim 16, comprising a plurality of said insulators.

18. The wheel assembly of claim 17, comprising four of said insulators.

19. The wheel assembly of claim 17, comprising eight of said insulators.

20. The wheel assembly of claim 13, further comprising a decorative wheel cover configured to cover at least a portion of said wheel and disposed adjacent said wheel and said hubcap.

* * * * *